(No Model.)  3 Sheets—Sheet 1.
F. FUNK.
TANK FOR WATERING STOCK.
No. 290,675.  Patented Dec. 25, 1883.
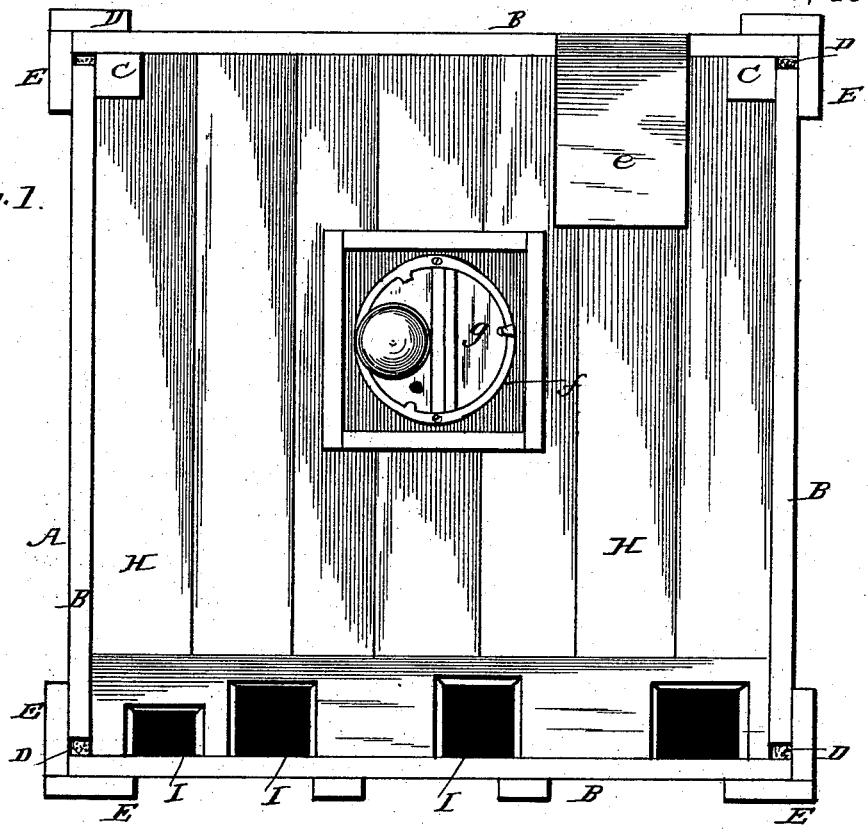
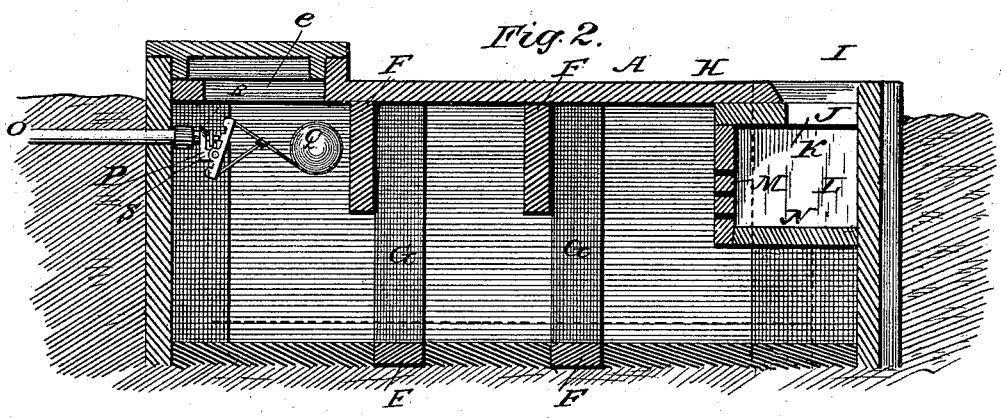
WITNESSES:
Frank Funk, INVENTOR.
By Louis Bagger & Co.
ATTORNEYS.

(No Model.) 3 Sheets—Sheet 2.
F. FUNK.
TANK FOR WATERING STOCK.
No. 290,675. Patented Dec. 25, 1883.
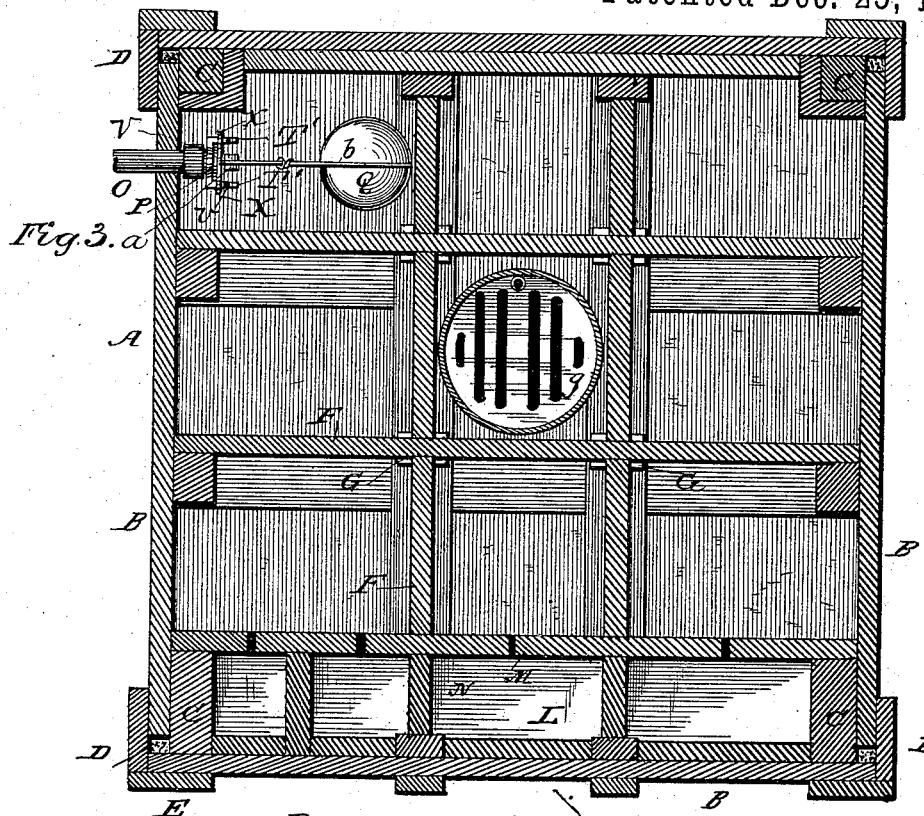
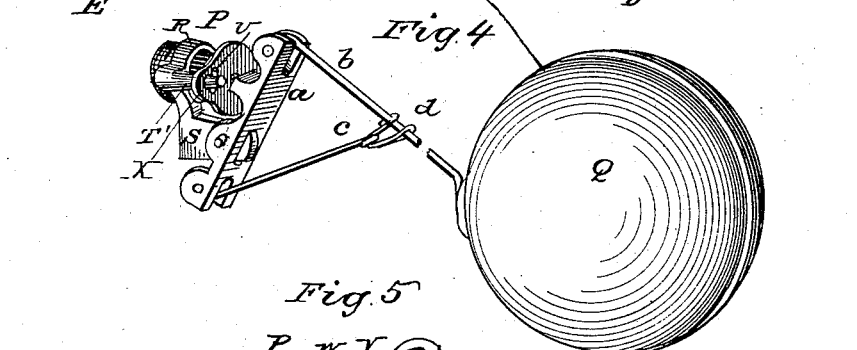
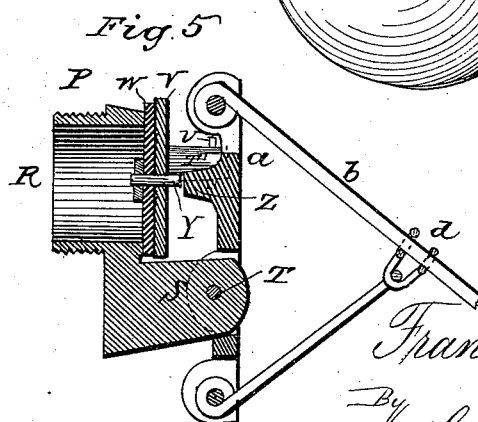
WITNESSES:
Frank Funk
INVENTOR.
By Louis Bagger & Co.
ATTORNEYS.

(No Model.) 3 Sheets—Sheet 3.
F. FUNK.
TANK FOR WATERING STOCK.
No. 290,675. Patented Dec. 25, 1883.
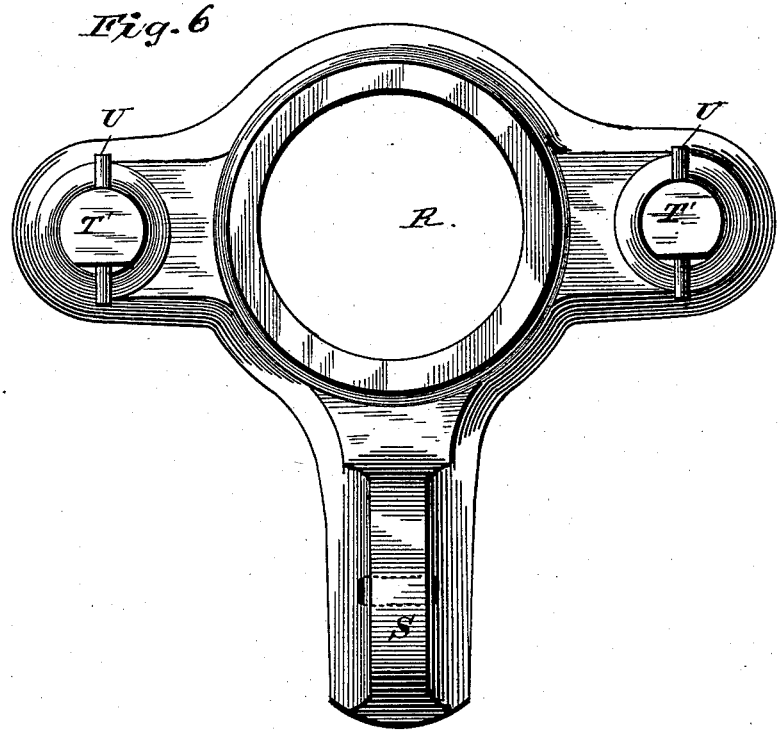
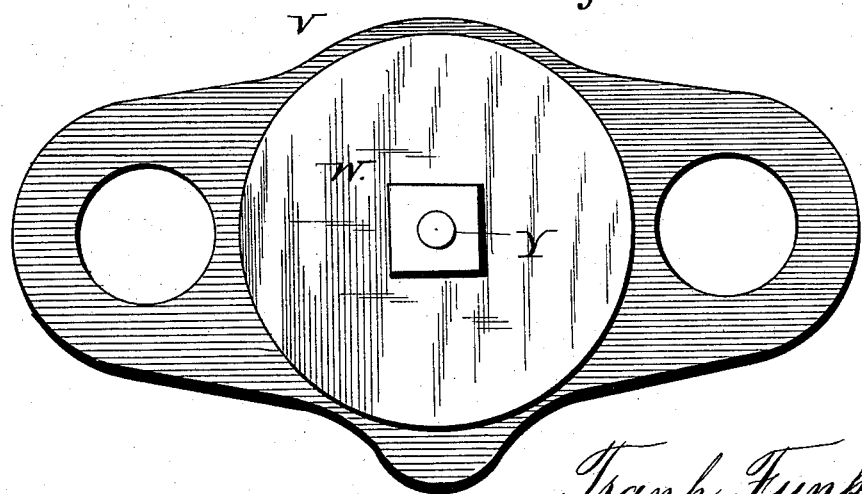
WITNESSES:
Fred. G. Dietrich.
With Leeder
Frank Funk
INVENTOR.
By Louis Bagger & Co.
ATTORNEYS.
N. PETERS, Photo-Lithographer, Washington, D. C.

United States Patent Office.

FRANK FUNK, OF BEVERLY, ILLINOIS.

TANK FOR WATERING STOCK.

SPECIFICATION forming part of Letters Patent No. 290,675, dated December 25, 1883.

Application filed August 8, 1883. (No model.)

*To all whom it may concern:*

Be it known that I, FRANK FUNK, a citizen of the United States, and a resident of Beverly, in the county of Adams and State of Illinois, have invented certain new and useful Improvements in Tanks for Watering Stock; and I do hereby declare that the following is a full, clear, and exact description of the invention, which will enable others skilled in the art to which it appertains to make and use the same, reference being had to the accompanying drawings, which form a part of this specification, and in which—

Figure 1 is a top view of my improved tank for watering stock. Fig. 2 is a vertical section of the same. Fig. 3 is a horizontal section. Fig. 4 is a perspective view. Fig. 5 is a vertical sectional view of the inlet-valve mechanism. Fig. 6 is a front view of the valve-seat, and Fig. 7 is a rear view of the valve.

Similar letters of reference indicate corresponding parts in all the figures.

My invention has relation to tanks for watering stock; and it consists in the improved construction and combination of parts of a tank and inlet-valve, as hereinafter more fully described and claimed.

In the accompanying drawings, the letter A indicates the tank, which is rectangular, consisting of four sides, B, secured at their ends to corner-posts C, leaving a small space, D, at each corner, between the ends of the sides, which space is covered upon the outside by planks or boards E, covering the corners. The sides of the tank are braced by means of cross-pieces, F, crossing the upper and lower end of the tank in both directions, and held supported apart from each other by means of props G, extending between each corner of the crossing braces. This casing is set into the ground, the bottom between the lower set of cross-braces is filled with tampered clay, and the corner-spaces D filled with clay or other plastic material, which will serve to make the tank water-tight, whereupon the top of the tank is covered with removable planks H, resting in rabbets formed in the top edges of the sides, and the entire tank covered with dirt, with the exception of the perforations I in the top planks, through which the stock may have access to the water. These perforations may be at only one side of the tank, as shown in the drawings, or around the entire tank, and lead down to a series of perforations, J, in a plank, K, which covers a trough, L, formed by one of the sides of the tank and a perforated side plank, M, and a bottom plank, N, the water entering the trough from the tank through the perforations in the side of the same. The water with which the tank is supplied passes from the pond or spring from which the water comes through a pipe, O, into the tank through one of the sides or through the bottom, as desired, the end of which pipe is provided with a valve mechanism, P, having a floating ball, Q, which rises when the water has reached the highest point in the tank, closing the valve mechanism, thus regulating the flow of water into the same. The end of the pipe O is provided with a flat valve-seat, R, screwed or otherwise secured upon it, extending at its lower end to form a forwardly-projecting lug or ear, S, having a transverse perforation, T, and forming at its sides two forwardly-projecting pins, T', having perforations in their outer ends, through which pass transverse pins U. A plate, V, having a flexible disk, W, upon its inner side, fitting over the open end of the supply-pipe, covering the valve-seat, and having two laterally-extending ears, X, having perforations, fitting over the forwardly-projecting pins and sliding upon the same, being prevented from sliding out too far by the transverse pins, serves as a clap-valve, and has upon its outer side a projecting pin, Y, against which a projection, Z, upon the inner side of a yoke, *a*, bears, which yoke is hinged upon the projecting lug S, and has hinged at its ends a longer rod, *b*, and a shorter rod, *c*, to the free end of the longer of which the floating ball is fastened, while a U-shaped hook, *d*, is hinged to the outer end of the shorter rod, the ends of which hook are bent to form hooks, which clasp the longer rod. It will now be seen that as the water rises the ball will rise with it, tilting the yoke in toward the valve, and closing the same more as it is tilted farther inward, and that by sliding the U-shaped hook upon the longer rod farther out the angle of the latter to the yoke will be more acute, thus causing the valve to close sooner than when the hook is slid nearer to the end of the yoke, making the angle formed by the longer rod and the yoke more obtuse. In this manner the valve may be adjusted to admit a given quantity of water, and will always insure against the tank being filled to overflowing.

An opening, e, in the top of the tank, serves to give access to the valve mechanism for the purpose of adjusting it or repairing it, and another opening, f, in the top, serves to introduce a heater, g, which is described in another application, for the purpose of heating the water in the winter time.

Having thus described my invention, I claim and desire to secure by Letters Patent of the United States—

1. A tank for watering stock, having spaces formed between the ends of the side pieces, for the purpose of receiving packing of clay or other plastic material, as and for the purpose shown and set forth.

2. A tank for watering stock, having braces crossing each other at its top and bottom, and having spaces formed in each corner by the ends of the side pieces for receiving packing of clay or other flexible material, as and for the purpose shown and set forth.

3. The combination, in a tank for watering stock, of a receiving-tank having means for stopping the access of water when full, with a trough fastened inside the receiving-tank and communicating with the tank through perforations in its inner side piece, and having apertures through which the stock may have access to the water, as and for the purpose shown and set forth.

4. In a tank for watering stock, a valve mechanism consisting of an inlet-pipe having a valve-seat upon its end, provided with a forwardly-projecting perforated lug at its lower side and two forwardly-projecting pins or lugs upon its sides, a plate having a flexible disk upon its inner side, two perforated ears sliding upon the pins upon the inlet-pipe, and a projection upon its outer side, a yoke hinged upon the lower perforated lug, and having a rod provided at its end with a floating ball, and a shorter rod provided with a U-shaped hook, sliding upon the longer rod, hinged upon its ends, all constructed and combined as and for the purpose shown and set forth.

In testimony that I claim the foregoing as my own I have hereunto affixed my signature in presence of two witnesses.

FRANK FUNK.

Witnesses:
WILLIAM SYKES,
JOHN G. SYKES.